(No Model.)

H. W. NOTT.
COMBINED SHAFT HOLDER AND WRENCH.

No. 396,048. Patented Jan. 8, 1889.

Witnesses.
Geo. F. Hooker
C. E. Doyle

Inventor,
Henry W. Nott.
By his Attorneys,

UNITED STATES PATENT OFFICE.

HENRY W. NOTT, OF CAMERON, TEXAS, ASSIGNOR OF ONE-HALF TO STERLING P. CROSS, OF SAME PLACE.

COMBINED SHAFT-HOLDER AND WRENCH.

SPECIFICATION forming part of Letters Patent No. 396,048, dated January 8, 1889.

Application filed May 2, 1888. Serial No. 272,576. (No model.)

To all whom it may concern:

Be it known that I, HENRY W. NOTT, a citizen of the United States, residing at Cameron, in the county of Milam and State of Texas, have invented a new and useful Improvement in Shaft-Holders and Carriage-Wrenches, of which the following is a specification.

My invention relates to a combination shaft-holder and carriage-wrench; and it has for its object to provide a simple device to uphold the shafts when not in use, and also serve as a tool to be used in the care of the vehicle.

The invention consists in a certain novel construction and arrangement of devices, fully set forth hereinafter in connection with the accompanying drawings, wherein—

Figure 1:
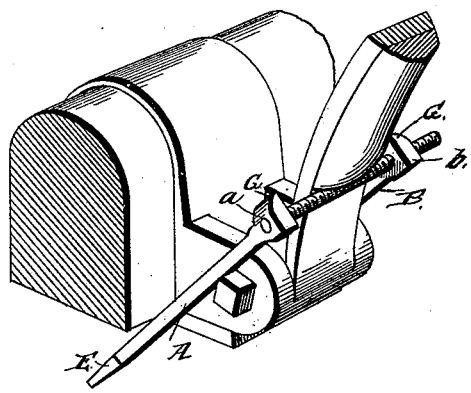
Figure 2:
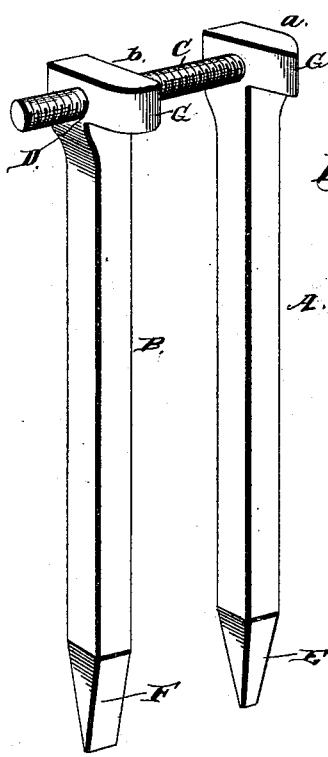
Figure 3:
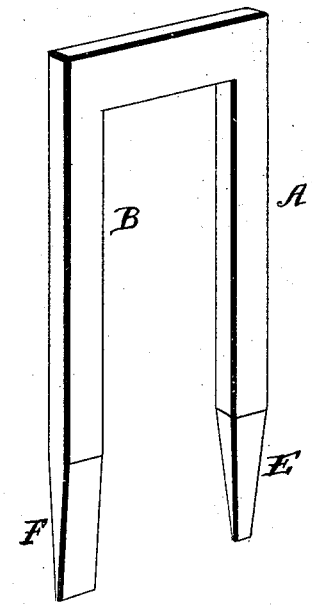

Figure 1 is a perspective view of a portion of an axle with the improved shaft-holder applied in the operative position. Fig. 2 is a detail perspective view of the combined tool. Fig. 3 is a view of a modified form of the device.

Referring to the drawings, A B represent the arms of the shaft-holder, having the heads $a$ $b$ on their ends, and C represents a threaded shaft, which is attached rigidly to the head on the arm A, and engages a tapped opening, D, in the head of the arm B. The lower ends of the arms are tapered to form screw-drivers E and F, (one of which is larger than the other, as shown,) and the upper ends of the arms are provided with jaws G G, connected to the heads above mentioned. These jaws are caused to approach and recede from each other by rotating the handle B around the threaded shaft and causing the tapped aperture to move on the same. The rear sides of the heads $a$ and $b$ project slightly beyond the faces of the arms and may be used as a hammer, and when used as a wrench the nut is grasped between the said jaws.

To apply the device to a vehicle to uphold the thills, separate the arms A B to the width of the thill, insert their lower ends under the axle or other convenient horizontal bar, and rest their intermediate points on the nuts at the sides of the thill-bearing, or projections formed on the sides of the box for the purpose, and it will be observed that the threaded shaft passes under the thill, and therefore supports it in its raised position. My improved shaft-holder therefore serves the purposes of a variety of tools, and it is, in addition, very simple in construction, and may be readily and quickly applied to the vehicle.

The modified form of the device which is shown in Fig. 3 is made of a single piece of metal or any other suitable material formed into substantially the same shape as the hereinbefore-described combination shaft-holder and wrench, (i. e., substantially three sides of a right-angled parallelogram,) the free ends of which may be tapered to form screw-drivers. There will be no wrench-jaws or hammer-head on the modified device, but it applies as a shaft-holder in the same manner as the hereinbefore-described combination-tool.

The whole or any part of the herein-described device, or its modified form, may be covered with oil-cloth, leather, or any desirable pliable substance, to prevent scratching or marring the paint on the vehicle; but this construction is not shown in the drawings, as the application of a protecting cover or padding will be readily understood.

Having thus described my invention, I claim—

1. In a combination shaft-holder and wrench, the combination of the arms A B, and the threaded shaft attached to the arm A and engaging a tapped aperture in the arm B, substantially as specified.

2. The combination of the arms A B, the jaws attached to the ends of the arms, and the threaded shaft attached to the end of the arm A and engaging a tapped aperture, D, in the arm B, substantially as specified.

3. The herein-described combination shaft-holder and carriage-tool, consisting of the arms A B, having their lower ends tapered to form screw-drivers E F, of different sizes, the heads on the upper ends of the arms, the jaws G G on the heads, and the threaded shaft attached to one of the arms and engaging a tapped aperture in the other arm, substantially as specified.

In testimony that I claim the foregoing as my own I have hereto affixed my signature in presence of two witnesses.

HENRY W. NOTT.

Witnesses:
J. M. CARMMES,
M. B. MORRIS.